United States Patent
Iizumi et al.

(10) Patent No.: US 12,158,620 B2
(45) Date of Patent: Dec. 3, 2024

(54) FIELD TERMINATED FIBER OPTIC CONNECTOR

(71) Applicant: Senko Advanced Components, Inc., Hudson, MA (US)

(72) Inventors: Kenji Iizumi, Tokyo (JP); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 157 days.

(21) Appl. No.: 17/785,378

(22) PCT Filed: Feb. 12, 2021

(86) PCT No.: PCT/US2021/017741
§ 371 (c)(1),
(2) Date: Jun. 14, 2022

(87) PCT Pub. No.: WO2021/163393
PCT Pub. Date: Aug. 19, 2021

(65) Prior Publication Data
US 2023/0020676 A1 Jan. 19, 2023

Related U.S. Application Data

(60) Provisional application No. 62/976,749, filed on Feb. 14, 2020.

(51) Int. Cl.
*G02B 6/38* (2006.01)

(52) U.S. Cl.
CPC ......... *G02B 6/3858* (2013.01); *G02B 6/3839* (2013.01)

(58) Field of Classification Search
None
See application file for complete search history.

(56) References Cited

U.S. PATENT DOCUMENTS

| | | | |
|---|---|---|---|
| 7,766,556 B2 * | 8/2010 | Kachmar | G02B 6/3825 385/76 |
| 9,678,283 B1 * | 6/2017 | Chang | G02B 6/3885 |
| 10,634,854 B2 * | 4/2020 | Davidson | G02B 6/38875 |
| 2005/0013547 A1 | 1/2005 | Rossi et al. | |
| 2008/0226236 A1 * | 9/2008 | Pepin | G02B 6/3858 385/81 |
| 2009/0257722 A1 * | 10/2009 | Fisher | G02B 6/3878 385/115 |
| 2014/0169743 A1 * | 6/2014 | Hodge | G02B 6/3893 385/54 |
| 2015/0268423 A1 | 9/2015 | Burkholder et al. | |
| 2020/0049903 A1 | 2/2020 | Okada et al. | |

OTHER PUBLICATIONS

PCT International Searching Authority, International Search Report and Written Opinion, dated Feb. 12, 2021, PCT Application No. PCT/US21/17741, 27 pages.

* cited by examiner

*Primary Examiner* — Jerry Rahll

(57) ABSTRACT

A field installable fiber optic connector for use with polymer optical fibers includes a housing that releasably connects to another optical device. A mechanical termination assembly is located in the housing to mechanically terminate a plurality of individual fibers of the polymer optical fibers. Ferrules are supported by the housing. Each ferrule is positioned to receive one of the individual fibers from the mechanical termination assembly.

14 Claims, 9 Drawing Sheets

FIELD TERMINATED FIBER OPTIC CONNECTOR

CROSS-REFERENCE TO RELATED APPLICATION

This application is a 35 U.S.C § 371 National Stage Entry of International Application No. PCT/US21/17741, filed Feb. 12, 2021, which claims the benefit of priority to U.S. Provisional App. No. 62/976,749, filed Feb. 14, 2020, the entireties of which are hereby incorporated by reference.

FIELD

The present disclosure generally relates to fiber optic connections, and, more specifically, to a fiber optic connector.

BACKGROUND

Optical connectors are used within optical communication networks to interconnect optical cables to optical devices or other optical cables. Optical connections typically involve two optical connectors connected together.

SUMMARY

In one aspect, a field installable fiber optic connector for use with polymer optical fibers comprises a housing configured for releasable connection to another optical device. A mechanical termination assembly is located in the housing and is configured to mechanically terminate a plurality of individual fibers of the polymer optical fibers. Ferrules are supported by the housing. Each ferrule is positioned for receiving one of the individual fibers from the mechanical termination assembly.

In another aspect, a mechanical termination assembly for terminating a plurality of fiber optic fibers generally comprises a first clamp member configured to receive the individual ones of the polymer optical fibers at spaced apart locations. A second clamp member is configured in a clamping position to simultaneously press the individual ones of the polymer optical fibers against the first clamp member to hold the individual fibers in position within the mechanical termination assembly.

In another aspect, a field installable fiber optic connector for use with polymer fiber optic fibers comprises a housing configured for releasable connection to another optical device. A mechanical termination assembly is located in the housing and is configured to mechanically terminate a plurality of individual fibers of the polymer optical fibers. The mechanical termination assembly is movable with respect to the housing. Ferrules are supported by the housing. Each ferrule is positioned for receiving one of the individual fibers from the mechanical termination assembly. The field installable fiber optic connector includes a spring for each of the ferrules. Each spring engages the mechanical termination assembly at a respective one of the ferrules for biasing the ferrules in a forward direction from the mechanical termination assembly. A damper is engaged with the mechanical termination assembly and the housing to bias the mechanical termination assembly in the forward direction. The damper is deformable upon application of a reaction force by the springs upon connection of the optical connector to another optical device to permit the mechanical termination assembly to move in a rearward direction relative to the housing.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
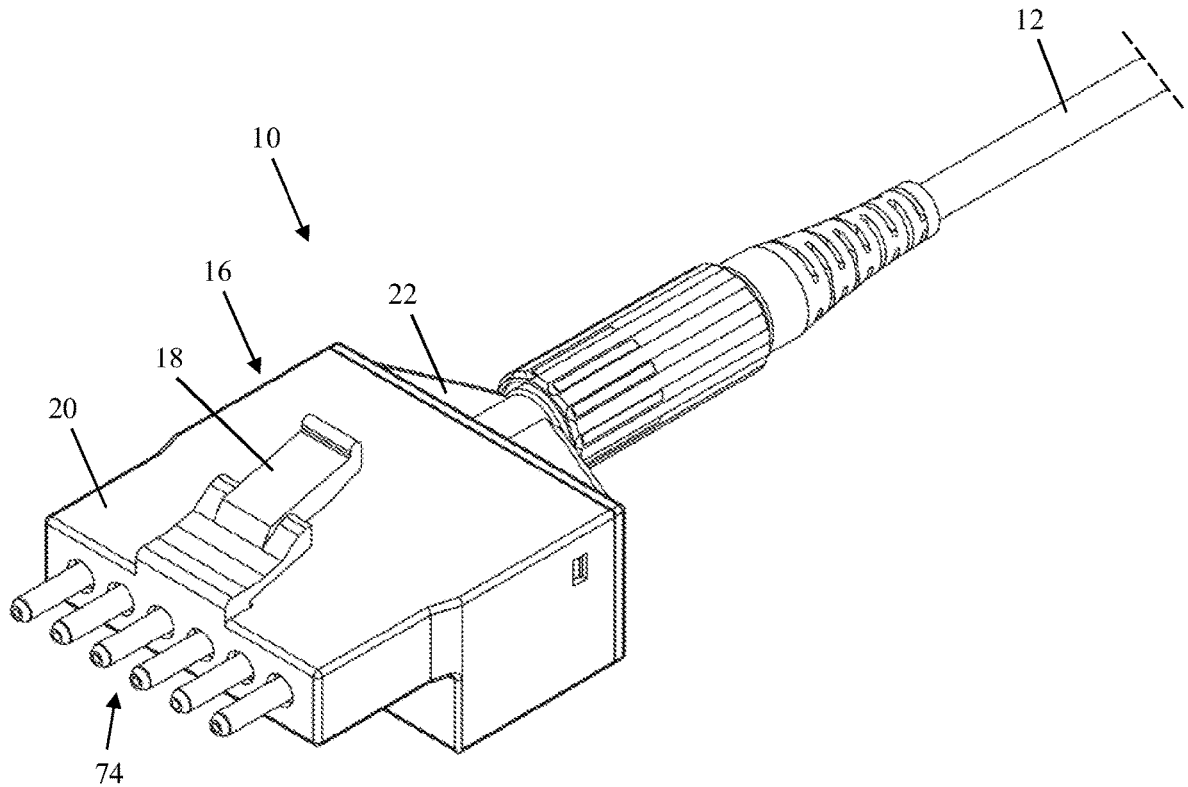
FIG. 1 is a perspective of a field terminated fiber optic connector according to one embodiment of the present disclosure.
Figure 2:
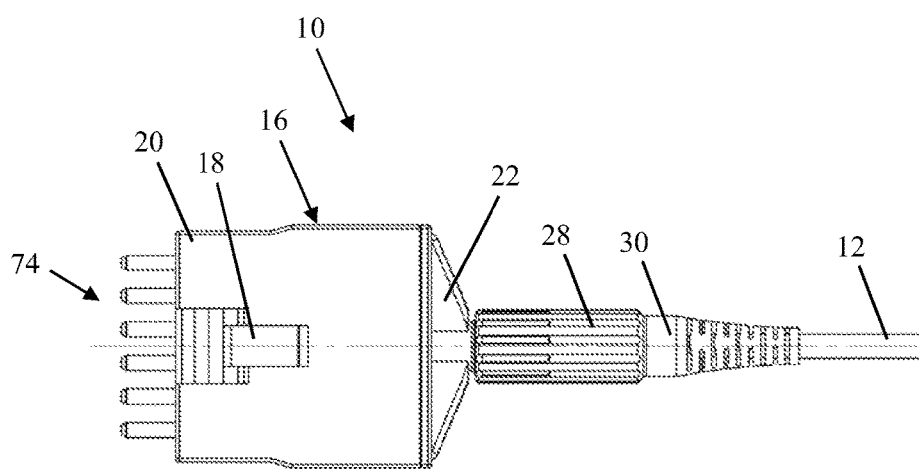
FIG. 2 is a top view thereof.
Figure 3:
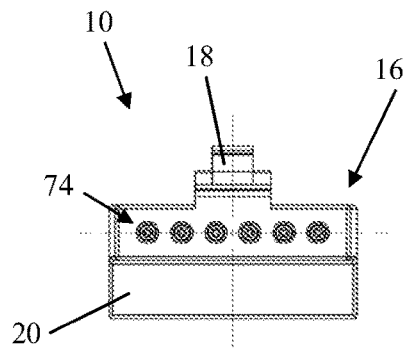
FIG. 3 is a front view thereof.
Figure 4:
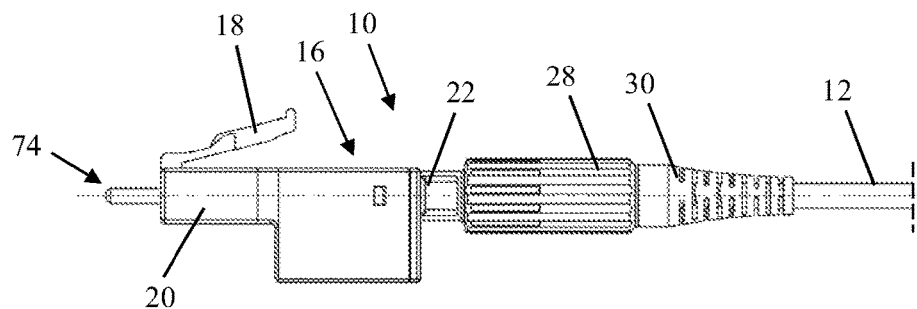
FIG. 4 is a side view thereof.
Figure 5:
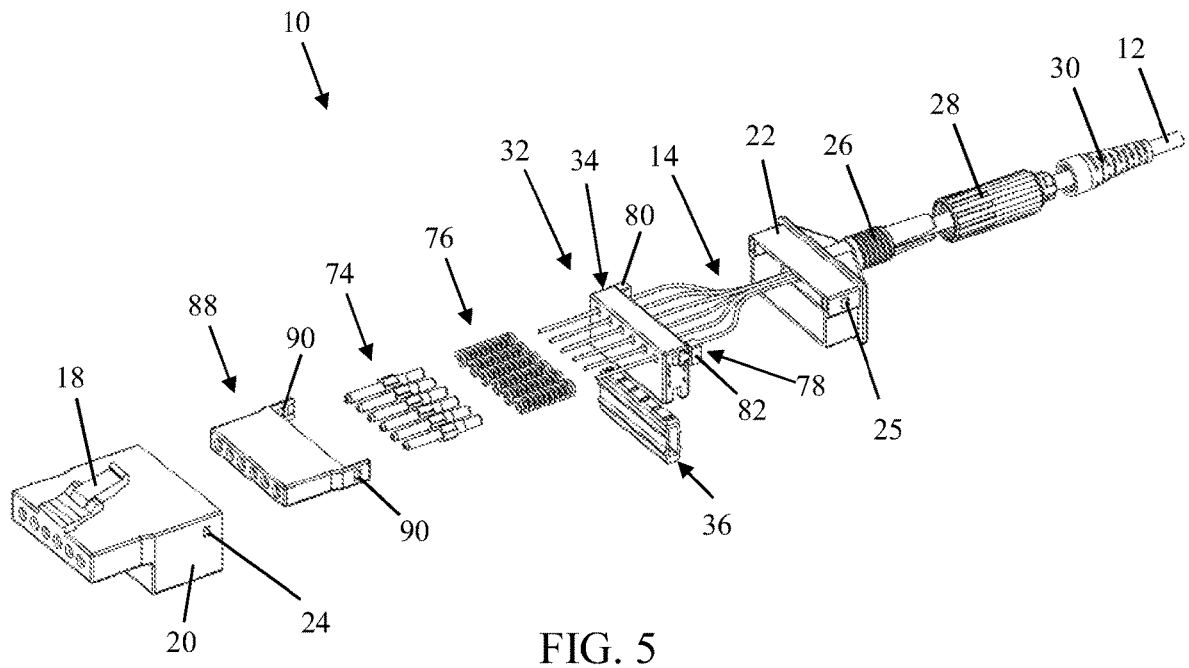
FIG. 5 is an exploded perspective of the field terminated fiber optic connector.
Figure 6:
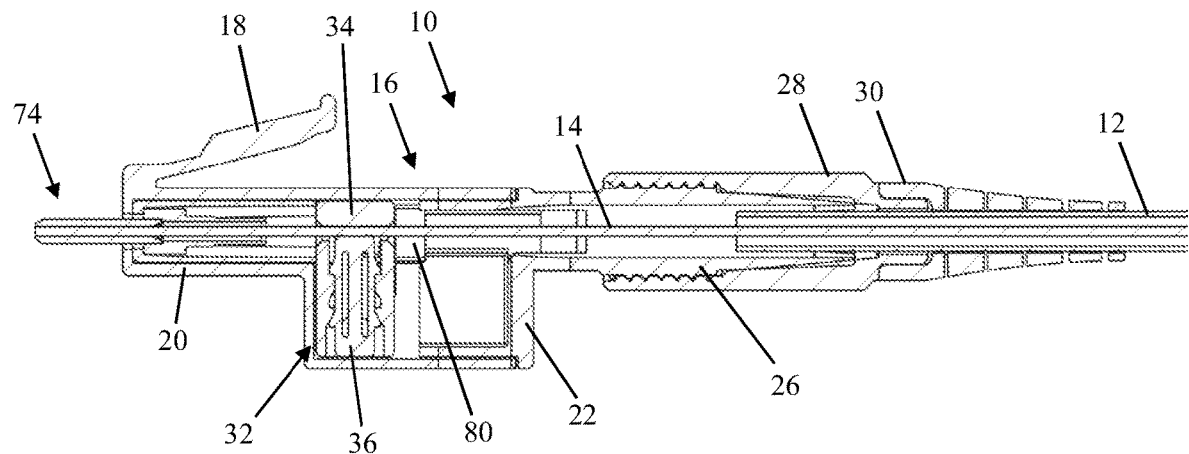
FIG. 6 is a longitudinal section of the field terminated fiber optic connector.

Referring to FIGS. 1-15, one embodiment of a fiber optic connector or field terminated fiber optic connector (hereinafter "connector") according to the present disclosure is generally indicated at reference numeral 10. The connector 10 forms a fiber optic connection with another fiber optic device (not shown), such as a fiber optic connector or adapter, to form an optical connection that enables communication between different fiber optic components (e.g., cables, devices, etc.) in an optical communications network. The connector 10 is attached to fiber optic cable 12. Each fiber optic cable 12 may have one or more optical fibers 14 (see, FIGS. 5 and 6), such as two, three, four, five, six, etc. optical fibers. In one embodiment, the optical fibers 14 may be polymer optical fibers (POF). The connector 10 can be assembled and attached to the fiber optic cable 12 in the field. Other configurations of the connector 10 are within the scope of the present disclosure. For example, the connector could make electrical or other types of connections instead of or in addition to an optical connection.

Figure 11:
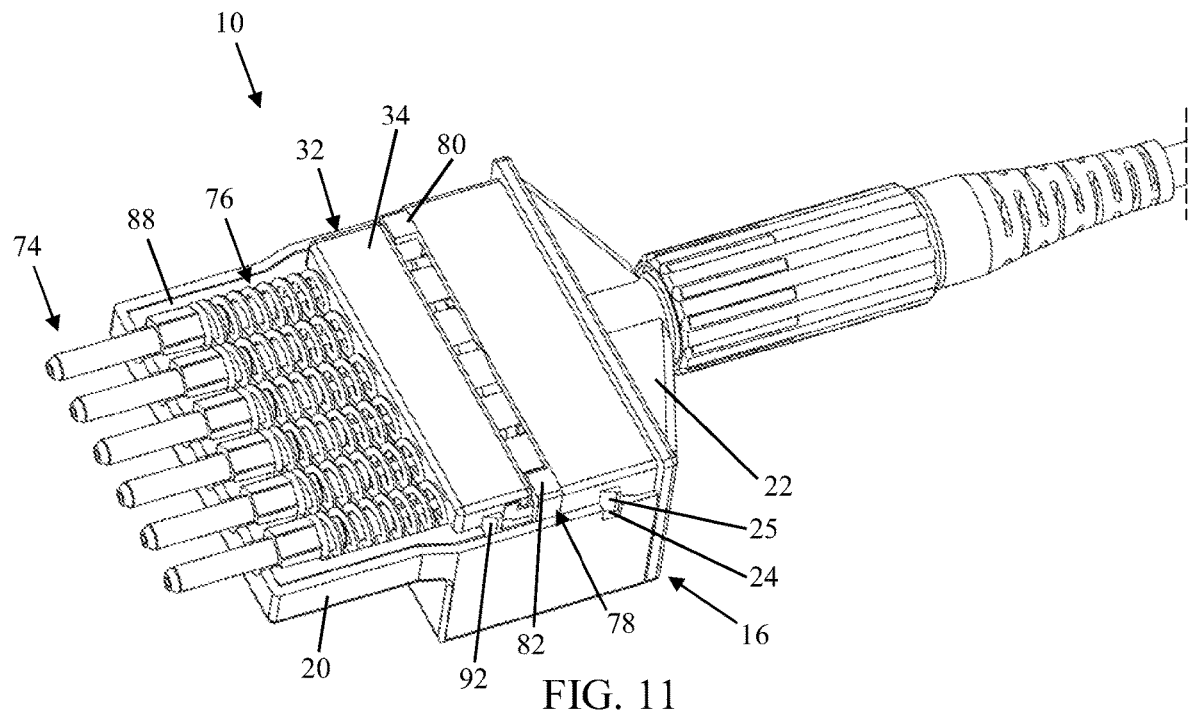
FIG. 11 is a perspective of the field terminated fiber optic connector, with a portion of an outer housing cut away to reveal interior details.

The connector 10 includes a housing 16 (e.g., connector housing). The housing 16 is configured for releasable connection to another fiber optic device (e.g., optical device). The housing 16 includes a latch 18 that forms the releasable connection with the other fiber optic device. The housing 16 generally surrounds and encloses various components of the connector 10. The housing 16 defines an interior sized and shaped to receive various components of the connector 10. In the illustrated embodiment, the housing 16 comprises a distal or front body 20 and a proximal or back body 22. The front and back bodies 20, 22 are configured to connect to each other. In the illustrated embodiment, the front body 20 includes slots 24 at receive respective catches or detents 25 of the rear body 22 to connect the two bodies together (FIG. 11). The rear housing 20 includes a back post 26 that is configured to connect to the fiber optic cable 12 and defines an opening to permit the optical fibers 14 of the cable to extend into the interior of the housing 16. The connector 10 includes a retainer nut 28 that threads onto the back post 26 to secure the cable 12 thereto and a strain relief boot 30. The strain relief boot 30 is attached to (and extends proximally from) the retainer nut 28 and extends over a length of the cable 12

Figure 16:
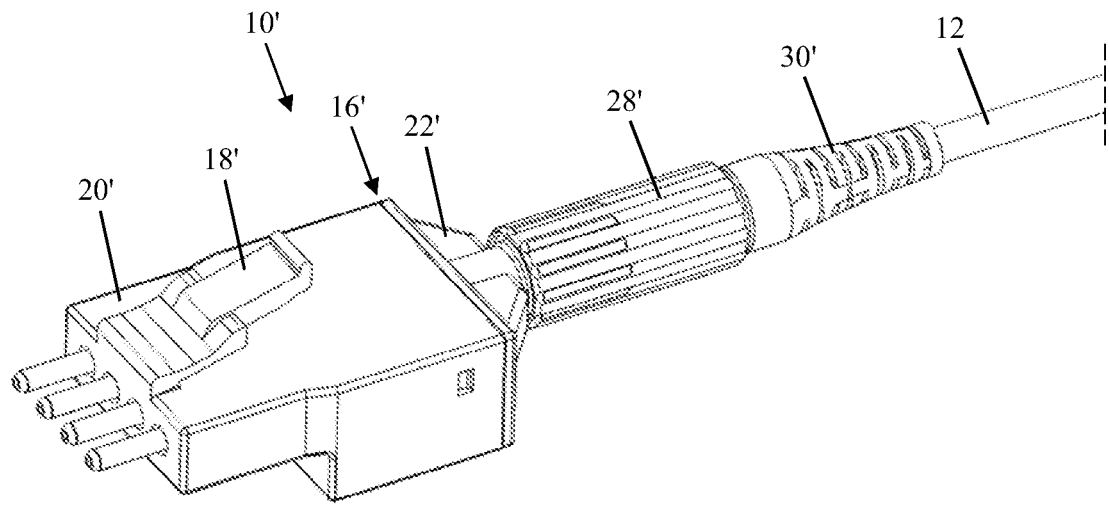
FIG. 16 is a perspective of another embodiment of a field terminated fiber optic connector according to the present disclosure.

In the illustrated embodiment, the connector 10 is configured as a six prong connector for connecting six optical fibers (e.g., forming six optical connections). Other configurations (e.g., more or fewer prongs) of the connector 10 are within the scope of the present disclosure. For example, the connector can be configured as a four prong connector for connecting four optical fibers. An example of such a four prong connector is generally indicate by reference numeral 10' in FIG. 16. Otherwise, connectors 10, 10' are generally the same and, thus, for ease of comprehension, similar, analogous or identical parts for connector 10' to that of connector 10 are designated by the same reference numeral with the addition of a trailing prime. Thus, the descriptions regarding connector 10 also apply to connector 10'.

Figure 7:
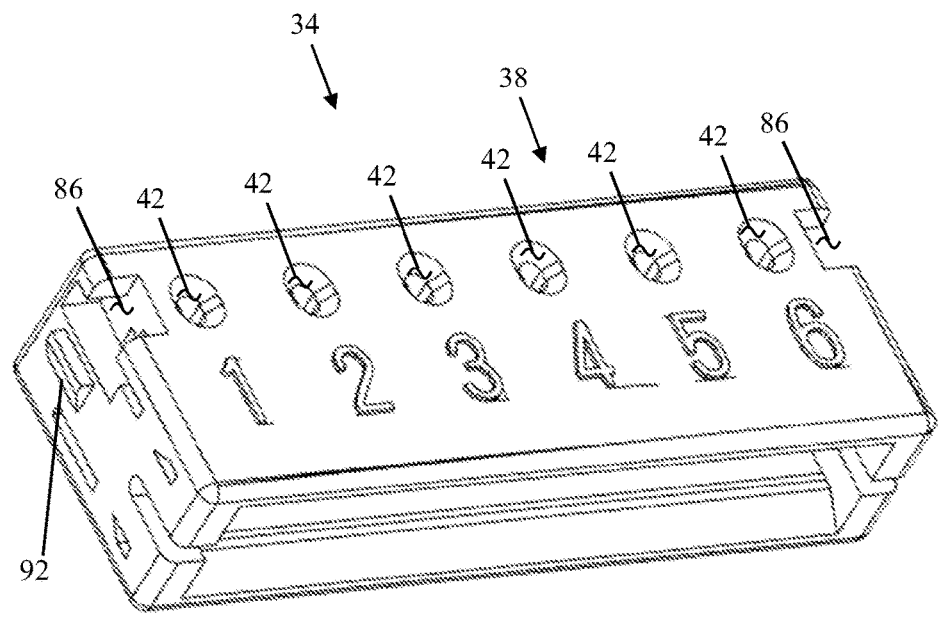
FIG. 7 is an enlarged perspective of a first clamp member of the field terminated fiber optic connector.
Figure 8:
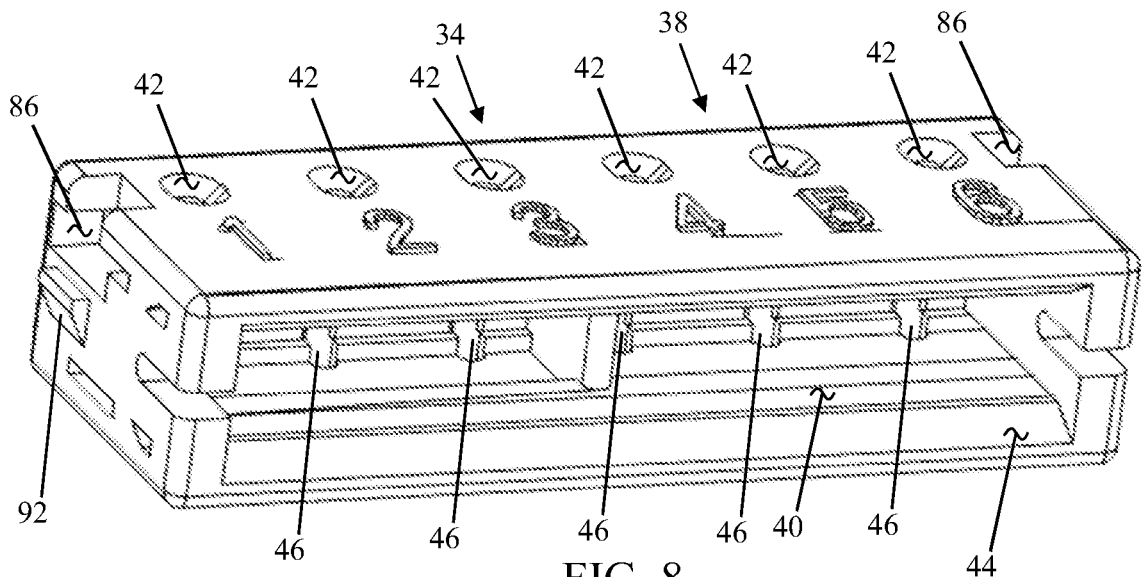
FIG. 8 is another perspective of the first clamp member.

The connector 10 includes a mechanical termination assembly 32. The mechanical termination assembly is located in the housing 16 (e.g., disposed in the interior). Specifically, the front and back bodies 20, 22 are sized and shaped for holding the mechanical termination assembly 32 within the space defined by the front body and the back body. The mechanical termination assembly 32 is configured to mechanically terminate a plurality of individual optical fibers 14 from the cable 12 (broadly, one or more optical fibers). Specifically, the mechanical termination assembly 32 is configured to clamp or fix the individual optical fibers 14. The mechanical termination assembly 32 includes a first clamp member 34 and a second clamp member 36. The first clamp member 34 is configured to receive the individual optical fibers 14 at spaced apart locations. Referring to FIGS. 7 and 8, the first clamp member 34 comprises a fiber clamp housing 38. The fiber clamp housing 38 has an internal cavity 40. The fiber clamp housing 38 also has a plurality of side openings 42 on either side of the fiber clamp housing. The side openings 42 receive the individual optical fibers 14 into the internal cavity 40. Each optical fiber 14 extends through one side opening 42, into and through the internal cavity 40 and then out a corresponding side opening on the other side of the fiber clamp housing 38. The fiber clamp housing 38 has a bottom opening 44 into the internal cavity 40. The first clamp member 34 (e.g., the fiber clamp housing 38) is formed with grooves 46 (e.g., partial grooves) for receiving portions of the individual optical fibers 14.

Each groove 46 receives one of the optical fibers 14. Each groove 46 extends between and interconnects two corresponding side openings 42 on opposite sides of the fiber clamp housing 38.

Figure 9:
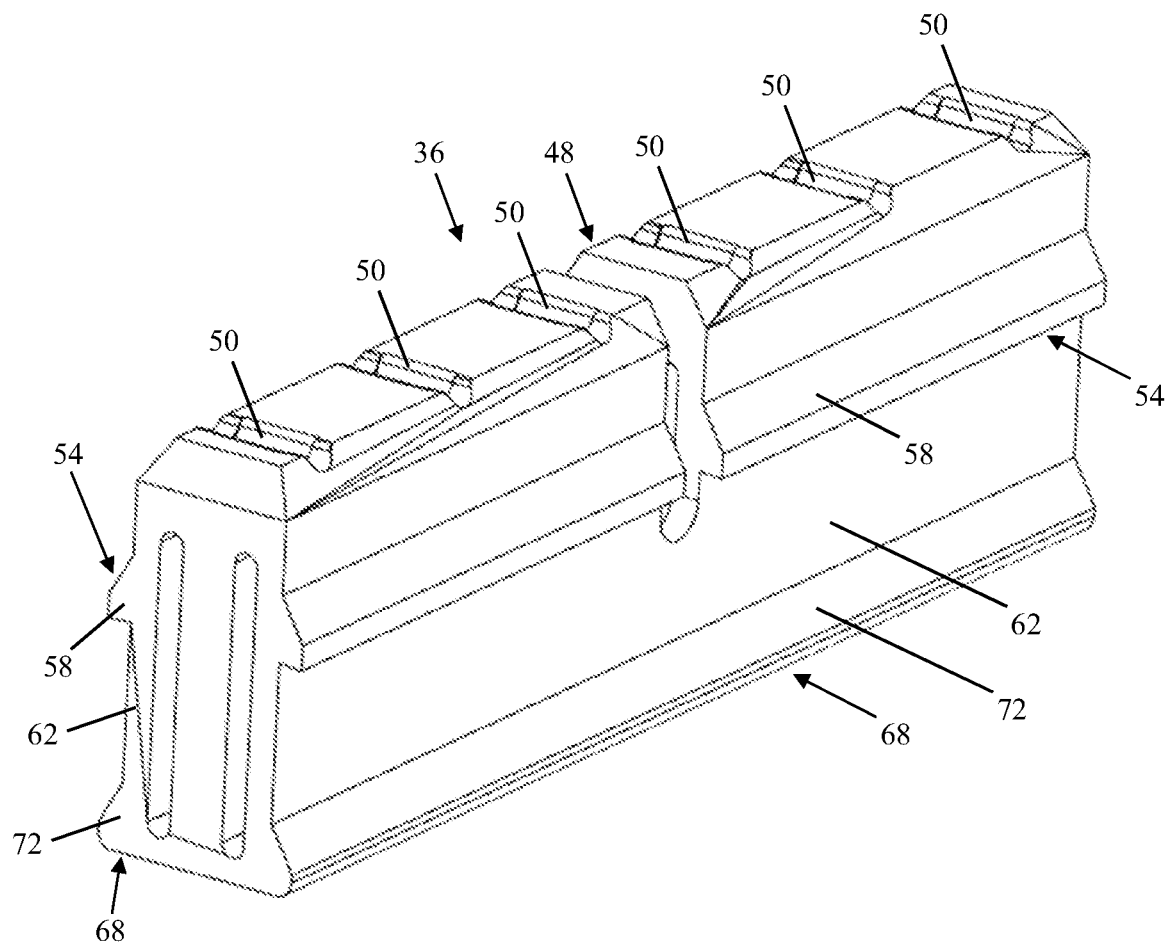
FIG. 9 is a perspective of a second clamp member of the field terminated fiber optic connector.
Figure 10A:
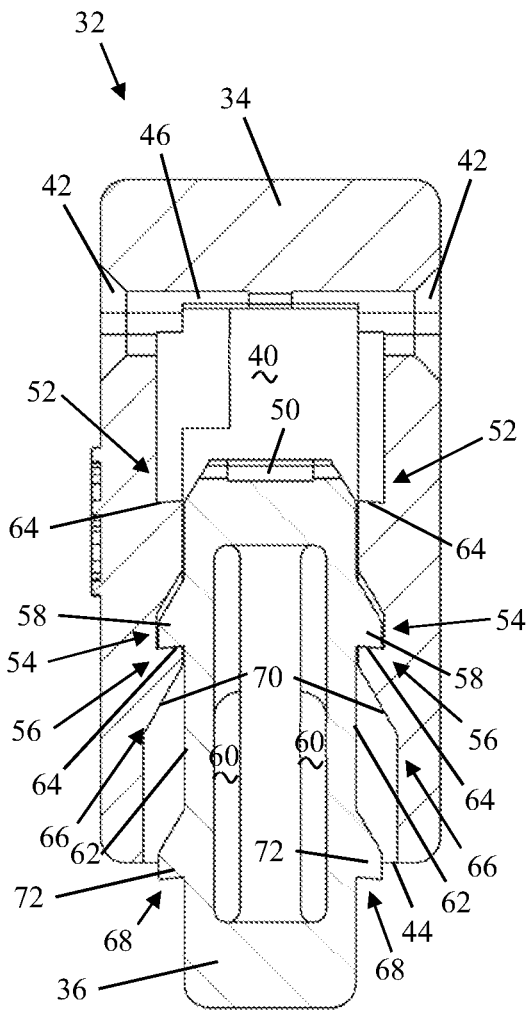
FIG. 10A is a cross-section of the first and second clamp members in an initial position.
Figure 10B:
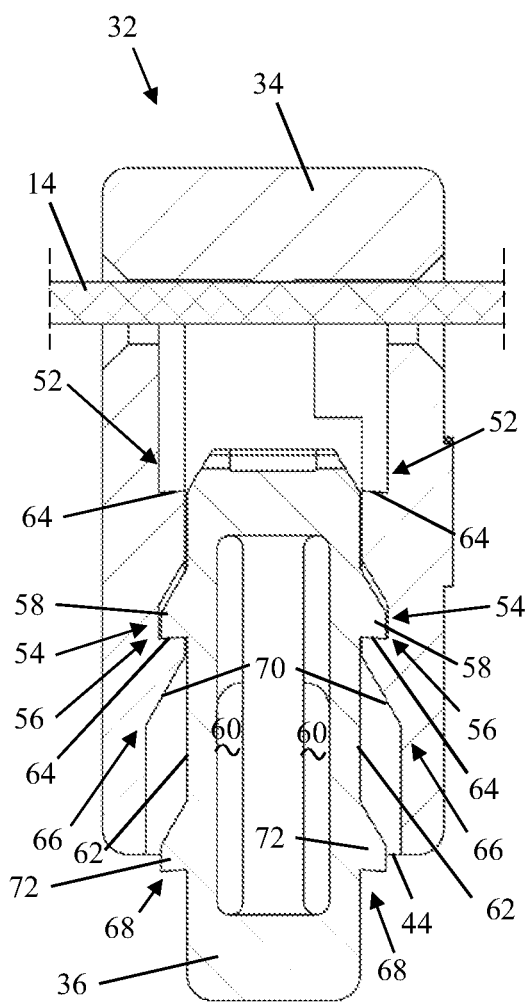
FIG. 10B is a cross-section of the first and second clamp members in the initial position with an optical fiber extending therethrough.
Figure 10C:
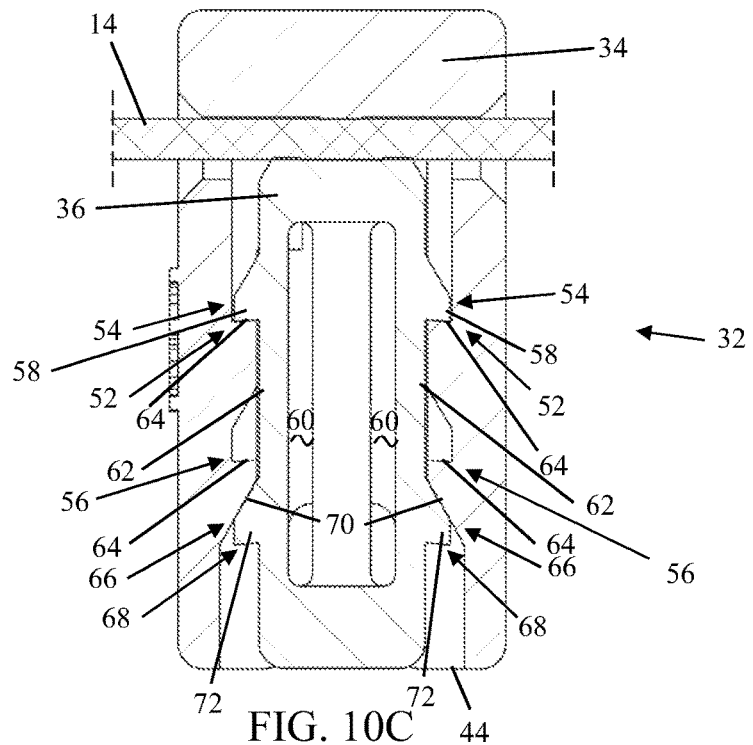
FIG. 10C is a cross-section of the first and second clamp members in a clamp position, clamping the optical fiber.

The second clamp member 36 is movable from an initial position (FIGS. 10A-B) to a clamping position (FIG. 10C). In the initial position, the second clamp member 36 is configured to permit the individual optical fibers 14 to be inserted through the first clamp member 34 (e.g., inserted through the side openings 42 and interior cavity 40). The second clamp member 36 is at least partially disposed in the interior cavity 40 when in the initial position. Specifically, the second clamp member 36 is spaced apart from the grooves 46 to provide the necessary clearance to permit the individual optical fibers 14 to be inserted through the first clamp member 34. In the clamping position, the second clamp member 36 is configured to simultaneously press the individual optical fibers 14 against the first clamp member 34 to hold (e.g., fix) the optical fibers in position within the mechanical termination assembly 32. Referring to FIG. 9, the second clamp member 36 comprises a retainer 48 configured to fit through the bottom opening 44 into the internal cavity 40 of the fiber clamp housing 38. The second clamp member 36 (e.g., the retainer 48) is formed with grooves 50 (e.g., partial grooves) for receiving portions of the individual optical fibers 14 when the second clamp member is in the clamp position. Each groove 50 of the second clamp member 36 is aligned with one of the grooves 46 of the first clamp member 34 for receiving and holding an individual optical fiber 14 therebetween when the second clamp member is in the clamp position.

Referring to FIGS. 10A-C, the first and second clamp members 34, 36 are configured for snap together connection. Specifically, the first and second clamp members 34, 36 are configured for snap together connection in the initial position. The first and second clamp members 34, 36 are also configured for snap together connection in the clamp position to hold the individual optical fibers 14. The first clamp member 34 includes a first retaining element 52 (broadly, at least one first retaining element) and the second clamp member 36 includes a second retaining element 54 (broadly, at least one second retaining element). Broadly, at least one of the first and second retaining elements 52, 54 is resiliently deformable upon movement of the second clamp member 36 so that the second retaining element may pass (e.g., move past) the first retaining element of the first clamp member 34, when the second clamp member is moved to the clamp position. The at least one of the first and second retaining elements 52, 54 return towards an undeformed state upon the second retaining element passing the first retaining element to block withdrawal of the second clamp member 36 from the first clamp member 34 and to retain the second clamp member in the clamp position (FIG. 10C). In the illustrated embodiment, the second retaining element 54 of the second clamp member 36 is resiliently deformable.

In the illustrated embodiment, the first clamp member 34 includes a third retaining element 56 (broadly, at least one third retaining element). The second and third retaining elements 54, 56 engage one another to block the withdrawal of the second clamp member 36 from the first clamp member 34 and to retain the second clamp member in the initial position prior to clamping the fibers 14. Thus, the second retaining element 54 resiliently deforms as the second retaining element moves from the third retaining element 56 to the first retaining element 52 (e.g., as the second clamp member 36 moves from the initial position to the clamp position). In the illustrated embodiment, the first clamp member 34 includes two first retaining elements 52 and two third retaining elements 56 and the second clamp member 36 includes two second retaining elements 54. Each second retaining element 54 corresponds to one of the first retaining elements 52 and one of the third retaining elements 56.

In the illustrated embodiment, the second retaining element 54 of the second clamp member 36 comprises a retention wing 58 (e.g., catches or detents). The retention wing 58 projects laterally outward from the second clamp member 36. The retention wing 58 generally extends along a side of the second clamp member 36. The second clamp member 36 also includes at least one internal void 60 positioned to facilitate resilient deflection of the retention wing 58. In the illustrated embodiment, the second clamp member 36 includes two internal voids 60. The retainer 48 includes walls 62, each wall defining a side of one of the internal voids 60. The walls 62 are resiliently deflectable and support the retention wings 58 (broadly, the second retaining element 54 includes one of the walls). The walls 62 deflect inward, into their respective internal void 60, when the retention wings 58 move toward the clamp position from the initial position (or when the retainer 48 is first being inserted into the first clamp member 34 and moved to the initial position). The walls 62 return or snap back to their undeformed state when the retention wings 58 align with the first retaining elements 52 in the clamp position (or when the retention wings align with the third retaining elements 56 in the initial position). In the illustrated embodiment, each first and third retaining element 52, 56 comprises a shoulder or lip 64 (e.g., a retaining surface). Each retention wing 58 engages one of the shoulders 64 to block withdrawal of the second clamp member 36 from the first clamp member 34.

In the illustrated embodiment, the first clamp member 34 and the second clamp member 36 are also configured to limit over clamping of the individual optical fibers 14, which can damage the optical fibers. The first clamp member 34 includes a first biasing element 66 (broadly, at least one first biasing element) and the second clamp member 36 includes a second biasing element 68 (broadly, at least one second biasing element). The first and second biasing elements 66, 68 engage when the first and second clamp members 34, 36 are in the clamp position (FIG. 10C). The engagement of the first and second biasing elements 66, 68 urges the second retaining element 54 of the second clamp member 36 against the first retaining element 52 of the first clamp member 34 (e.g., into the clamp position). In other words, the engagement of the first and second biasing elements 66, 68 biases the second clamp member 36 in a direction that is away from the optical fibers 14. However, the configuration of the first and second clamp members 34, 36 is such that they still clamp the optical fibers 14 when the second clamp member is in the clamp position, even though the second clamp member is biased way from the optical fibers. In the illustrated embodiment, the first clamp member 34 includes two first biasing elements 66 and the second clamp member 36 includes two second biasing elements 68. Each second biasing element 68 corresponds to one of the first biasing elements 66.

In the illustrated embodiment, each first biasing element 66 comprises a sloped surface 70 on the first clamp member 34. Each second biasing element 68 comprises a biasing wing 72 (e.g., catch or detent). The biasing wing 72 has a sloped surface corresponding to the sloped surface 70 of the first clamp member. The biasing wing 72 projects laterally from the second clamp member 34. Each biasing wing 72 (e.g., sloped surface thereof) of the second clamp member 36 engages its corresponding sloped surface 70 of the first clamp member 34 when the second clamp member is in the clamp position. Each biasing wing 72 is supported by one of the walls 62. The engagement between the biasing wing 72 and the sloped surface 70 may resiliently deform the wall, thereby facilitating the biasing.

Referring to FIGS. 11-15, the connector 10 includes a plurality of ferrules 74 (broadly, at least one ferrule). In the illustrated embodiment, the connector 10 includes six ferrules, although more or fewer ferrules (e.g., four) are within the scope of the present disclosure. Each ferrule 74 is supported by the housing 16. Each ferrule 74 is positioned for receiving one of the optical fibers 14 from the mechanical termination assembly 32. In particular, each ferrule 74 is connected to one of the optical fibers 14. Each ferrule 72 is configured to form the optical connection with the fiber optic device the connector 10 is connected to. Each ferrule 74 extends distally out of (e.g., through a ferrule opening of) the housing 16 (e.g., front body 20).

The connector 10 includes a spring 76 for each ferrule 74. In the illustrated embodiment, each spring 76 is a coil spring. Each spring 76 engages the mechanical termination assembly 42 and its corresponding ferrule 74 (e.g., a flange thereof) for biasing the ferrule in a forward or distal direction from the mechanical termination assembly. Specifically, each spring 76 biases its corresponding ferrule 76 toward the front or distal end of the housing 16 (e.g., the front body 20). The springs 76 push the ferrules 74 distally to help maintain an engagement of the ferrule with the fiber optic device to which the connector 10 is connected.

Still referring to FIGS. 11-15, the mechanical termination assembly 32 is movable with respect to the housing 16 (e.g., is mounted for movement on the housing 16). Specifically, the mechanical termination assembly 32 can move proximally and distally within the interior of the housing 16. The connector 10 includes a damper 78 (broadly, at least one damper) operatively connected to the mechanical termination assembly 32. The damper 78 is disposed (e.g., operatively disposed) between the housing 16 and the mechanical termination assembly 32. The damper 78 resiliently biases the mechanical termination assembly 32 in a forward or distal direction. The damper 78 is deformable upon application of a reaction force (in generally the proximal direction) by the springs 76 upon connection of the connector 10 to another fiber optic device to permit the mechanical termination assembly to move in a rearward or proximal direction relative to the housing 16. This movement permitted by the damper 78 minimizes the forces imparted on the optical fibers 14 during connection of the connector 10 to the fiber optic device, thereby reducing the likelihood of any damage to the optical fibers. The damper 78 also keeps the reaction force from the springs 76 substantially uniform across the mechanical termination assembly 32 and ferrules 74.

In the illustrated embodiment, the damper 78 comprises a first resiliently compressible member 80 and a second resiliently compressible member 82. The first resiliently compressible member 80 is located or disposed generally at one side of the mechanical termination assembly 32 and the second resiliently compressible member 82 is located or disposed generally at another, opposite side of the mechanical termination assembly. Preferably, the first and second resiliently compressible members 80, 82 are made of an elastomeric material.

In the illustrated embodiment, the damper 78 is engaged with the mechanical termination assembly 32. Specifically, the damper 78 is (e.g., the resiliently compressible members 80, 82 are) attached to the mechanical termination assembly 32. Each resiliently compressible member 80, 82 includes a connector 84 (FIGS. 14 and 15) that connects the resiliently compressible member to the mechanical termination assembly 32. Each connector 84 is located or disposed in (e.g., mates with) a corresponding connector recess 86 (FIGS. 7 and 8) in the mechanical termination assembly 32 to attach the components together. The connector recesses 86 are defined by the first clamp member 34. In the illustrated embodiment, the connector 84 comprises a hook (e.g., a T-hook) and the connector recess 86 is sized and shaped to generally match the size and shape of the T-hook (e.g., the recess is a T-shaped recess). Other configurations of the damper 78 are within the scope of the present disclosure.

Figure 12:
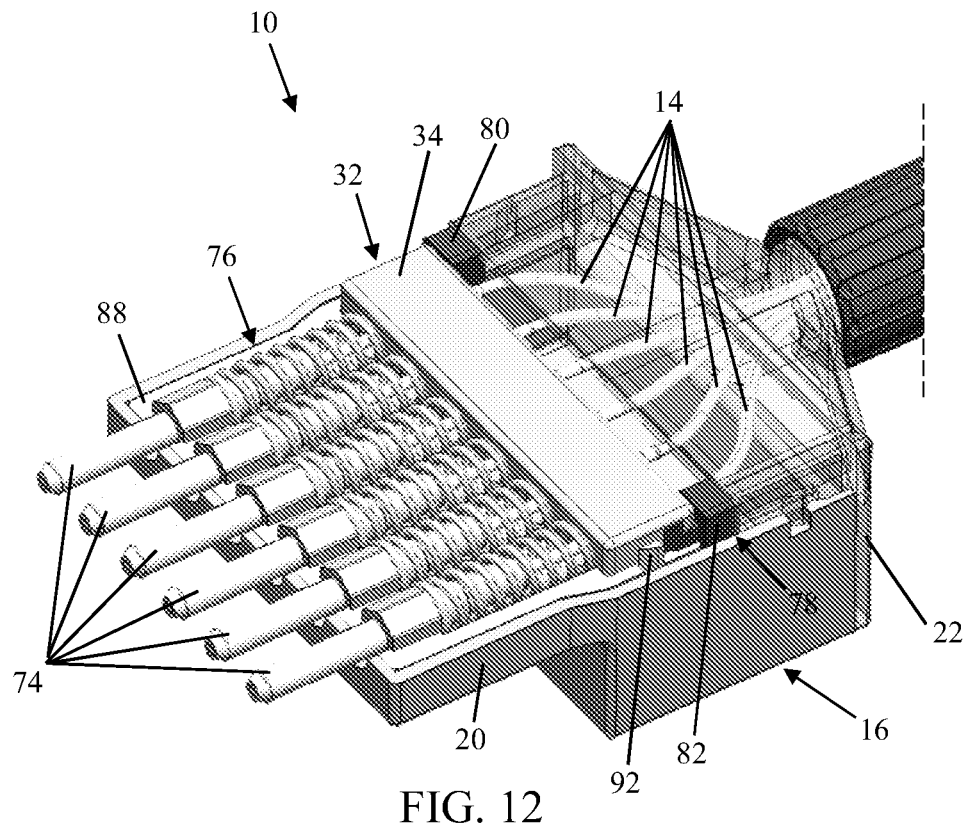
FIG. 12 is similar to FIG. 11, with a back housing shown as transparent to reveal interior details.
Figure 13:
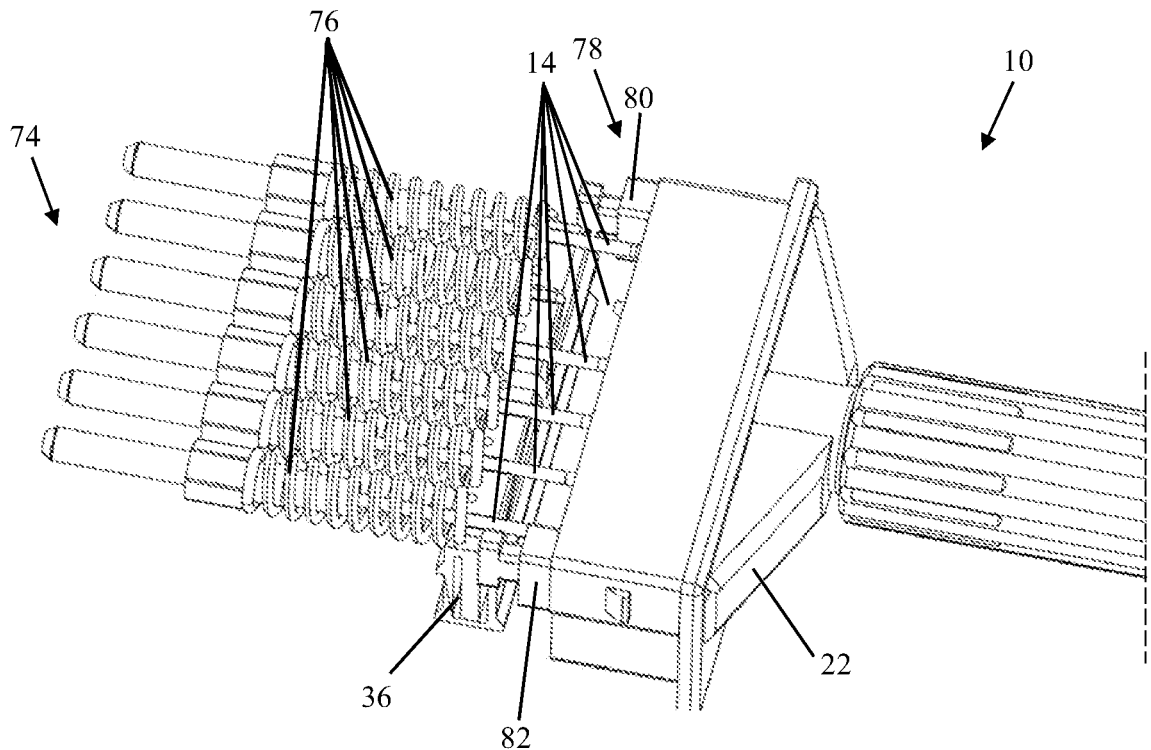
FIG. 13 is a perspective of the field terminated fiber optic connector with the outer housing and an inner frame hidden from view to reveal interior details.
Figure 14:
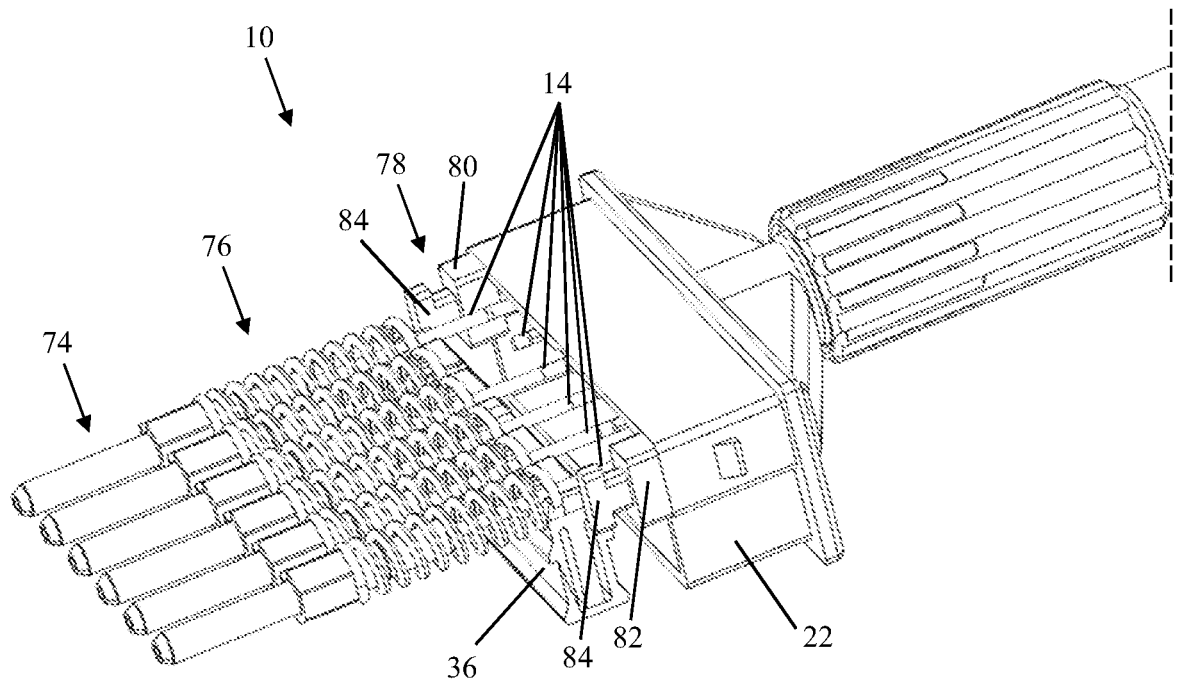
FIG. 14 is another perspective of the field terminated fiber optic connector with the outer housing and the inner frame hidden from view to reveal interior details.
Figure 15:
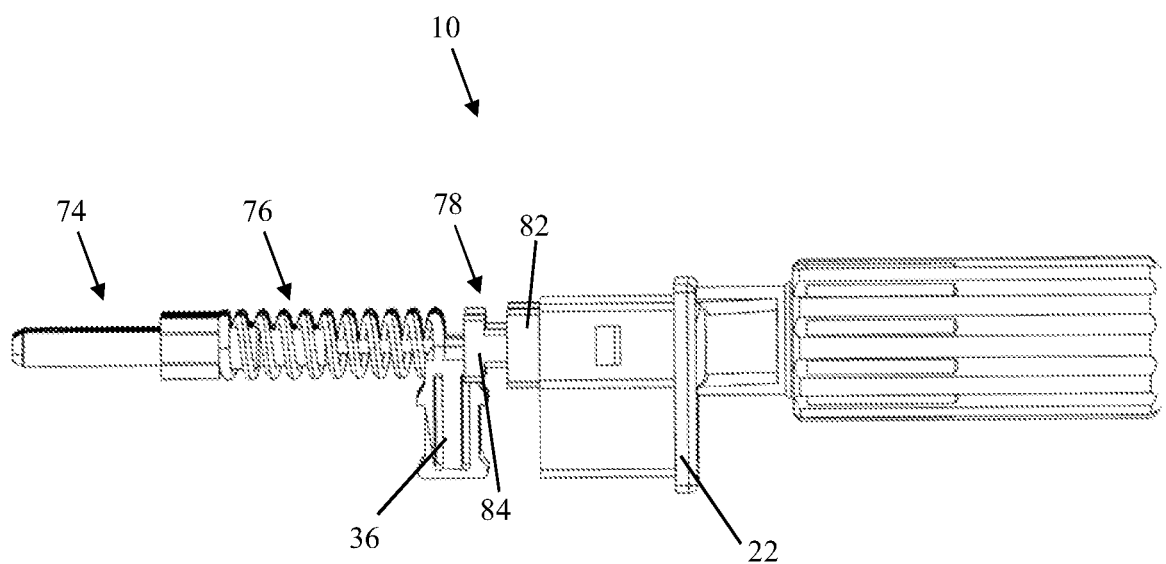
FIG. 15 is a side view of the field terminated fiber optic connector with the outer housing and the inner frame hidden from view to reveal interior details.

Referring back to FIGS. 5, 7, 8, 11 and 12, the connector 10 includes an inner frame 88. The inner frame 88 is disposed in the interior of the housing 16. The inner frame 88 is connectable to the mechanical termination assembly 32 to capture the ferrules 74 and springs 76 between the mechanical termination assembly and the inner frame. In the illustrated embodiment, the inner frame 88 includes slots 90 (FIG. 5) at receive respective catches or detents 92 (FIGS. 7 and 8) of the mechanical termination assembly 32 to connect the inner frame and mechanical termination assembly together (FIGS. 11 and 12). The inner frame 88 moves conjointly with the mechanical termination assembly 32. The dampers 78 engaging the back body 22 so that the unit formed by the inner frame 88 and mechanical termination assembly 32 does not move with respect to the back body and front body 20 unless a force is applied to the ferrules 74 as describe hereinabove. The inner frame 88 defines an interior that receives the ferrules 74 and springs 76. The front or distal end of the inner frame 88 defines openings (e.g., ferrule openings) that align with the openings in the front or distal end of the front body 20. The ferrules 74 extend distally out of the openings in the inner frame 88 and the front body 20.

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors therein to align and connect optical fibers end-to-end. As described herein, the connectors and adapters may be considered multi-fiber connectors and multi-fiber adapters.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A field installable fiber optic connector for use with polymer optical fibers, the fiber optic connector comprising:
   a housing configured for releasable connection to another optical device;
   a mechanical termination assembly located in the housing configured to mechanically terminate a plurality of individual fibers of the polymer optical fibers;
   ferrules supported by the housing, each ferrule being positioned for receiving one of the individual fibers from the mechanical termination assembly,
   wherein the mechanical termination assembly comprises a first clamp member configured to receive the individual ones of the polymer optical fibers at spaced apart locations, and a second clamp member configured in a clamping position to simultaneously press the individual ones of the polymer optical fibers against the first clamp member to hold the individual fibers in position within the mechanical termination assembly,
   wherein the first and second clamp members are configured for snap together connection in the clamp position to hold the individual fibers of the polymer optical fibers,
   wherein the first clamp member includes a first retaining element and the second clamp member includes a second retaining element, at least one of the first and second retaining elements being resiliently deformable upon movement of the second clamp member whereby the second retaining element may pass the first retaining element of the first clamp member, said at least one of the first and second clamp members returning toward an undeformed shape upon the second retaining element passing the first retaining element to block withdrawal of the second clamp member from the first clamp member and retain the second clamp member in the clamp position.

2. The field installable fiber optic connector according to claim 1 wherein
   the second retaining element comprises a retention wing projecting laterally outward from the second clamp member.

3. The field installable fiber optic connector according to claim 2 wherein
   the second clamp member includes at least one internal void positioned to facilitate resilient deflection of the retention wing.

4. The field installable fiber optic connector according to claim 1 wherein
   the first clamp member includes a first biasing element and the second clamp member includes a second biasing element, the first and second biasing elements being engaged in the clamp position of the first and second clamp members to urge the second retaining element of the second clamp member against the first retaining element of the first clamp member.

5. The field installable fiber optic connector according to claim 4 wherein
   the second biasing element comprises a biasing wing projecting laterally from the second clamp member and the first biasing element comprises a sloped surface on the first clamp member, the biasing wing engaging the sloped surface of the first clamp member in the clamp position.

6. The field installable fiber optic connector according to claim 1 wherein the first clamp member is formed with partial grooves for receiving portions of the individual ones of the polymer fiber optic fibers.

7. The field installable fiber optic connector according to claim 6 wherein
the second clamp member is formed with partial grooves to receiving portions of the individual ones of the polymer fiber optic fiber when in the clamp position.

8. The field installable fiber optic connector according to claim 1 wherein
the first clamp member comprises a fiber clamp housing having an internal cavity, a plurality of side openings for receiving individual ones of the polymer fiber optic fibers into the internal cavity and a bottom opening into the internal cavity, the second clamp member comprising a retainer configured to fit through the bottom opening into the internal cavity of the fiber clamp housing.

9. The field installable fiber optic connector according to claim 1 wherein
the mechanical termination assembly is mounted for movement on the housing, the fiber optic connector further comprising a damper disposed between the housing and the mechanical termination assembly and resiliently biases the mechanical termination assembly in a forward direction.

10. The field installable fiber optic connector according to claim 1 in combination with the polymer fiber optic fibers.

11. A field installable fiber optic connector for use with polymer fiber optic fibers, the fiber optic connector comprising:
a housing configured for releasable connection to another optical device;
a mechanical termination assembly located in the housing configured to mechanically terminate a plurality of individual fibers of the polymer optical fibers, the mechanical termination assembly being movable with respect to the housing;
ferrules supported by the housing, each ferrule being positioned for receiving one of the individual fibers from the mechanical termination assembly;
a spring for each of the ferrules, each spring engaging the mechanical termination assembly at a respective one of the ferrules for biasing the ferrules in a forward direction from the mechanical termination assembly;
a damper engaged with the mechanical termination assembly and the housing biasing the mechanical termination assembly in the forward direction, the damper being deformable upon application of a reaction force by the springs upon connection of the optical connector to another optical device to permit the mechanical termination assembly to move in a rearward direction relative to the housing.

12. A field installable fiber optic connector for use with polymer optical fibers, the fiber optic connector comprising:
a housing configured for releasable connection to another optical device;
a mechanical termination assembly located in the housing configured to mechanically terminate a plurality of individual fibers of the polymer optical fibers;
ferrules supported by the housing, each ferrule being positioned for receiving one of the individual fibers from the mechanical termination assembly,
wherein the mechanical termination assembly comprises a first clamp member configured to receive the individual ones of the polymer optical fibers at spaced apart locations, and a second clamp member configured in a clamping position to simultaneously press the individual ones of the polymer optical fibers against the first clamp member to hold the individual fibers in position within the mechanical termination assembly,
wherein the first clamp member includes a first biasing element and the second clamp member includes a second biasing element, the first and second biasing elements being engaged in the clamp position of the first and second clamp members to urge the second retaining element of the second clamp member against the first retaining element of the first clamp member.

13. The field installable fiber optic connector according to claim 12 wherein
the second biasing element comprises a biasing wing projecting laterally from the second clamp member and the first biasing element comprises a sloped surface on the first clamp member, the biasing wing engaging the sloped surface of the first clamp member in the clamp position.

14. A field installable fiber optic connector for use with polymer optical fibers, the fiber optic connector comprising:
a housing configured for releasable connection to another optical device;
a mechanical termination assembly located in the housing configured to mechanically terminate a plurality of individual fibers of the polymer optical fibers;
ferrules supported by the housing, each ferrule being positioned for receiving one of the individual fibers from the mechanical termination assembly,
wherein the mechanical termination assembly comprises a first clamp member configured to receive the individual ones of the polymer optical fibers at spaced apart locations, and a second clamp member configured in a clamping position to simultaneously press the individual ones of the polymer optical fibers against the first clamp member to hold the individual fibers in position within the mechanical termination assembly,
the first clamp member comprises a fiber clamp housing having an internal cavity, a plurality of side openings for receiving individual ones of the polymer fiber optic fibers into the internal cavity and a bottom opening into the internal cavity, the second clamp member comprising a retainer configured to fit through the bottom opening into the internal cavity of the fiber clamp housing.

* * * * *